Jan. 14, 1969 D. MENGE 3,421,751

APPARATUS FOR FABRICATING WOOD STRUCTURES

Filed Dec. 23, 1966 Sheet 1 of 3

INVENTOR
DONALD C. MENGE

BY Hauke, Kraus, & Gifford
ATTORNEYS

Jan. 14, 1969 D. MENGE 3,421,751
APPARATUS FOR FABRICATING WOOD STRUCTURES
Filed Dec. 23, 1966 Sheet 3 of 3

INVENTOR
DONALD C. MENGE
BY Hauke, Kress, & Gifford
ATTORNEYS

United States Patent Office 3,421,751
Patented Jan. 14, 1969

3,421,751
APPARATUS FOR FABRICATING WOOD STRUCTURES
Donald Menge, Warren, Mich., assignor to Troy Steel Corporation, Troy, Mich., a corporation of Michigan
Filed Dec. 23, 1966, Ser. No. 604,359
U.S. Cl. 269—305                         5 Claims
Int. Cl. B23q 3/06; B25c 7/00

ABSTRACT OF THE DISCLOSURE

Apparatus for fabricating wood trusses to align and hold pre-cut lower chord members, upper chord members and web members of various types of trusses so that nailing plates may be driven into the members to fasten the truss together. The apparatus includes a length of track supported by a dolly clampable generally upon two contiguous rail members, the dolly supporting in turn a track which may be angularly adjusted and clamped to any appropriate position in a horizontal plane so that the track may be aligned with an upper chord member. Joint station pedestals carried by the track support the truss where the web and upper chord intersect so that nailing plates can be fastened at these intersections.

---

This invention relates to apparatus for fabricating wood structures, and more particularly to apparatus for fabricating wood trusses of the type having lower chord members, upper chord members, and web members extending between the lower chord and the upper chord members.

The invention is concerned with apparatus for fabricating wood trusses which function as jigs for locating, guiding, aligning and holding pre-cut lower chord members, upper chord members and web members of a W, hip, kingpost, scissors truss, or the like, such that nailing plates may be positioned at the intersections of the diverse wood members preparatory to being driven into the members, by means such as a movable hydraulic press, to fasten the members together to form the truss. The apparatus of the invention provides for the economical fabrication and mass production of trusses of different dimensions.

In heretofore available apparatus of this class, pedestals are disposed at the intersections of the upper and lower chord members, respectively, with the web members for accurate aligning and holding of the members preparatory to driving the nailing plates, such pedestals being adjustably mounted on rail or track members on which they are capable of being clamped at predetermined positions. Generally, a track member supporting a plurality of adjustably movable pedestals is anchored to the ground along the lower chord line of the truss to be fabricated. Substantially at mid-distance between the ends of such first track, and disposed at a right angle therewith, there is a second track, also anchored to the ground and adapted to support one or more pedestals adjustably movable along the height of the truss and clampable upon such track. On both sides of the second track, generally at regular intervals, are disposed a plurality of other tracks, or, preferably, rail members, supporting in turn short lengths of track supported at each end by each of two contiguous rail members and clampable thereon, the short lengths of track being oriented substantially parallel to the lower chord track. Each short length of track is adjustable towards and away from the lower chord track and is adapted to support a pedestal adjustable along a line parallel to the lower chord. The pedestals are used as joint stations for supporting, guiding and maintaining in position the upper chord members and the web members preparatory to their assembly by means of nailing plates. Because the upper chord members are generally at an angle to the lower chord members, except when it is desired to fabricate a flat roof truss structure, and are arranged to converge to the apex of the truss, each short length of track is capable of supporting only one joint station pedestal, as there is only one point at which the longitudinal axis of the track cuts the axis of a given upper chord member. Consequently, as many short track elements must be arranged in combination in the apparatus as there are junctions between the upper chord members and the web members.

The present invention provides for an improvement consisting of a length of track supported by a dolly clampable generally upon two contiguous rail members, the dolly supporting in turn a track which may be angularly adjusted and clamped to any appropriate position in the horizontal plane such that the track may be aligned with an upper chord member, and more than one joint station pedestal may be mounted upon the track at the appropriate positions where the end of a web member engages the side of the upper chord member. The apparatus for fabricating wood structures incorporating the improvement of the invention is thus much more flexible than the old style apparatus and permits fabrication of, for example, roof wood trusses of different slopes with simple and rapid adjustment.

Furthermore, the invention provides the disposing, for example, two such apparatus side by side on a predetermined floor area, such that two trusses may be fabricated at the same time when the size of each truss is included within the size of each apparatus, while permitting the whole area covered by the two apparatus, to be used for fabricating a single truss of a span equal to the sum of the spans covered by each apparatus.

The principal advantage and object of the present invention, consequently, is to provide an apparatus for fabricating wood structures of the character indicated including one or more joint stations each mounted on a pedestal which is in turn clamped on a track which may be adjustably oriented angularly in a horizontal plane with respect to the support member or dolly for such track.

Another object of the present invention is to provide an apparatus of the character indicated including joint station pedestals which can be mounted anywhere along the upper chord of a wood truss being fabricated, and which is not limited to one joint station pedestal situated at or near the mid-point of each one of the top or upper chord members.

Another object of the invention is to provide an apparatus of the character indicated which can be easily set up for fabricating wood trusses of any design, conventional or not, such as fan web trusses, six panel Howe trusses, W trusses, hip trusses, kingpost trusses, scissors trusses and the like.

A further object of the present invention to provide an apparatus of the character indicated which is easily and rapidly set up for production of a continuous run of similar wood trusses, and which can be easily adjusted and re-set for production of a run of trusses of a different design.

Yet another object of the invention is to provide an apparatus of the character indicated utilizing much simpler joint station fixtures for inclined chord members than are available in conventional equipment.

Yet a further advantage of the present invention is to provide an apparatus of the character indicated which can be easily set up for joining the lower chord members of a scissors truss with the web members thereof without any difficult or trial setup.

Another object and advantage of the present invention is to provide an apparatus of the character indicated consisting of two apparatus for fabricating wood structure disposed side by side on a floor area and used in combination to fabricate wood trusses of a maximum span equal to the sum of the maximum spans of the wood trusses capable of being fabricated on each individual apparatus.

Those and additional objects and advantages of the present invention will become apparent when the following description is considered in conjunction with the accompanying drawings depicting an example of a preferred configuration of the improvement of the present invention, together with several aspects of practical utilization thereof. In the several drawings, wherein like reference characters refer to like or equivalent parts:

FIG. 8 is an example of the utilization of two apparatus incorporating the improvement of the invention being disposed side by side on a given floor area and being set up for fabricating two different wood trusses of different spans and slopes; and FIG. 9 is a schematic representation of the apparatus of FIG. 8 being utilized in combination for fabricating a wood truss of a span substantially equal to the sum of the spans of the trusses capable of being fabricated according to the setup of FIG. 8.

Figure 1:
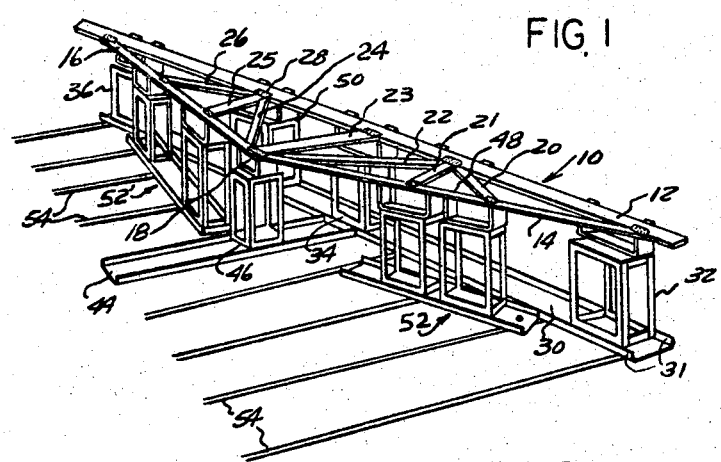
FIG. 1 is an isometric view of an apparatus for fabricating wood structures, such as wood trusses, incorporating the improvement of the present invention.
Figure 2:
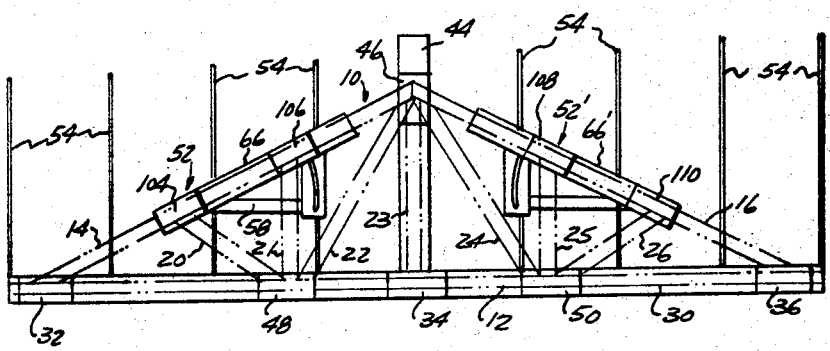
FIG. 2 is a schematic plan view of the apparatus of FIG. 1.

Referring to the drawings, and more particularly to FIGS. 1-2 therein, there is shown an apparatus for fabricating wood structures incorporating the improvement of the present invention and being set up for assembling pre-cut wood members for forming a triangular of W roof wood truss 10. As shown, the roof truss 10 comprises a lower chord member 12 and two upper chord members 14 and 16 which intersect at the peak or apex 18 of the truss. Web members 20, 21, 22, 23, 24, 25 and 26 join the lower chord member 12 with the upper chord members 14–16 as shown, in the manner well known to those skilled in the art. The lower truss member 12 may consist of one member or it may, in substantially large span trusses, consist of two members joined together substantially at the center of the lower chord by way of a couple of nailing plates disposed above and below the wood members forming the lower chord and adapted to solidly join them together at their abutting ends. Such nailing plates may be similar to the nailing plates disclosed in U.S. Letters Patent No. 3,011,226, issued Dec. 5, 1961, to the nailing plate which is subject matter of co-pending application Ser. No. 392,851, filed Aug. 28, 1964, or of any other nailing or gusset plates well known to those skilled in the art. A pair of such nailing plates is also used for connecting together the diverse chord members with the web members at their junctions, by being power driven, by means such as a hydraulic press, each on one side of the wood members. One of such nailing plates is shown in position at 28 in FIG. 5 being used for joining a chord member with a pair of web members, it being understood that a similar nailing plate is also disposed on the other side of the members.

Figure 5:
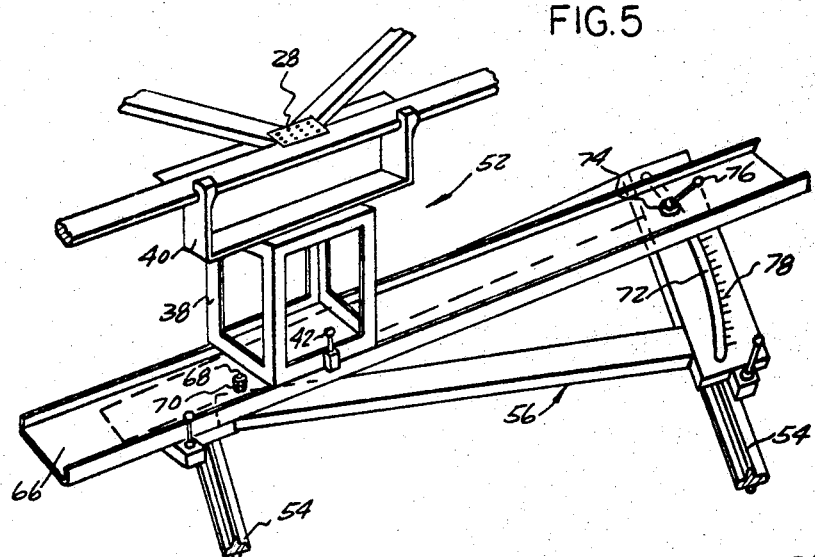
FIG. 5 is an isometric view of a structural example of the improvement according to the present invention.

A track member 30 is disposed along the lower chord of the wood truss, such track member 30 being solidly anchored to the ground, and having two upturned edges 31 adapted to support joint station pestals 32, 34 and 36 as shown in FIGS. 1 and 2. All the joint station pedestals are substantially the same and each, as shown in FIG. 5, comprises a frame 38 on the top of which is mounted a guiding, aligning and locating jig 40 for the purpose of holding, aligning and maintaining in position the diverse wood members for the purpose of joining them by means of an upper and lower nailing plate, one such nailing plate being shown at 28. The pedestal 38 is adjustably positionable along its support track and is provided with clamping means 42 for the purpose of clamping the pedestal solidly to its track member once positioned in its appropriate location.

As shown in FIGS. 1-2, a second track member 44 is positioned along the vertical web member 23 joining the apex 18 of the truss to substantially the mid-point of the lower chord member 12. A joint station pedestal is clamped upon the second track member 44, as shown at 46, for the purpose of supporting the apex 18 of the truss and for defining the joint station for the abutting ends of the two upper chord members 14 and 16 and the upper end of the web member 23. Intermediate pedestals 32 and 34, and clamped upon the track member 30 in an appropriate position, is disposed another pedestal, as shown at 48, which is adapted to support the lower chord member 12 and the appropriate ends of respectively web members 20, 21 and 22, with proper holding and aligning for joining of the web members with the lower chord members by means of nailing plates. Intermediate pedestal 34 and 36 is also disposed, in a position symmetrical to the position occupied by pedestal 48, a pedestal 50 supporting the joint station for the lower chord member 12 with the appropriate end of the web members 24, 25 and 26.

The apparatus for fabricating wood structures so far described is according to the principles generally well known to those skilled in the art. As shown in FIGS. 1-2 and more particularly in details in FIGS. 5-7, the improvement of the invention consists principally of a jig member designated generally at 52 or 52', which is adapted for adjustable angular positioning in a horizontal plane so as to be aligned with some of the wood members forming a truss, and particularly with the members forming the upper chord portion of a roof truss structure. As shown in the drawings, such a jig 52 or 52' is normally positioned and adapted to be displaceable along a pair of juxtaposed rail members, such as rail members 54, disposed at regular intervals substantially perpendicular to lower chord track member 30, and solidly anchored to the ground.

Figure 6:
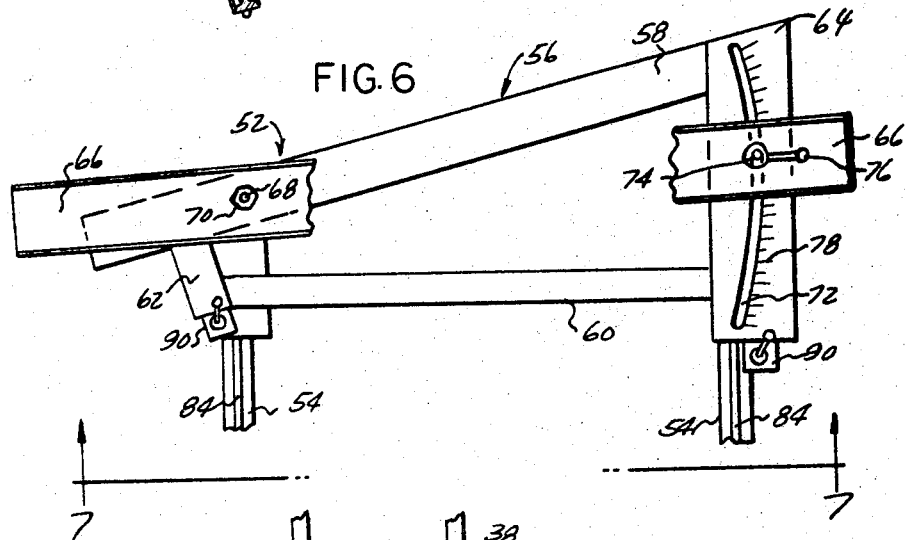
FIG. 6 is a top plan view thereof with portions broken away.
Figure 7:
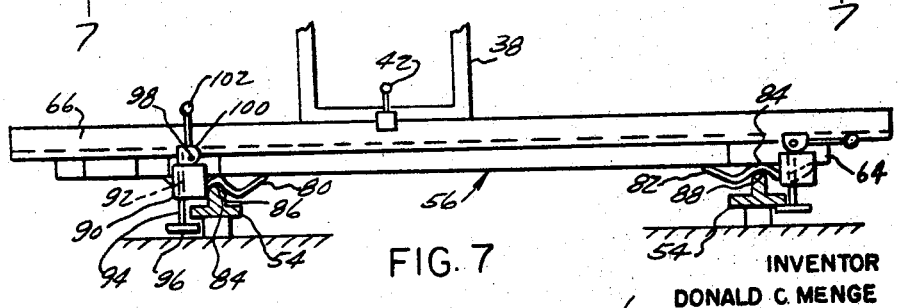
FIG. 7 is an elevation view from line 7—7 of FIG. 6.

As best shown in FIGS. 5-7, each jig member 52 comprises a dolly 56 of substantially triangular shape and comprising two principal frame members 58 and 60 joined at the ends closest together by way of a cross member 62, and joined at their other ends by way of a plate member 64. Frame members 58 and 60 are fastened on cross member 62 and plate member 64 by any conventional means such as bolting, but preferably the whole dolly assembly 56 consists of a weldment to insure easy, fast and durable fabrication. A channel track member, identical to the channel track member forming track members 30 and 44, and designated 66 is disposed with respect to the dolly 56 so as to be capable of swiveling and so as to be manually set to any required angular position in the horizontal plane. For that purpose, proximate to one of its ends, track member 66 is provided substantially at its center line with an aperture, not shown, aligned with an aperture (not shown) disposed in frame member 58 proximate its end where it is connected to cross member 62, so as to form a pivot point defined by a bolt 68 passing through the aligned apertures and cooperating with nut 70. Proximate the other end of track member 66, there is another aperture, not shown, also substantially on the center line of the channel forming the track member, and which is adapted to register with an arcuate slot 72 formed in plate member 64 of the dolly, arcuate slot 72 having a radius substantially equal to the distance separating the pivot point defined by bolt 68 from the arcuate slot. A bolt 74 is engaged through the aperture in the end of the track member 66 and through slot 72 and is adapted to cooperate with, for example, a handle 76 having a threaded bore engaging the threaded end of bolt 74, so as to provide an easily manually actuable clamping means for connection of the track member 66 upon the dolly 56 in any appropriate horizontal angular position as permissible due to the length of slot 72. It is evident that bolt 68 may also be replaced by a similar handled nut, and that, to insure strong fastening of the track member 66 upon the dolly 58 in any predetermined angular position, nut 70 may also be tightened. In order to provide a practical angular reference of the position of track member 66 with respect to the dolly 56 and consequently, as will be hereinafter explained, with respect to track rail member 54, graduations or indicia such as shown at 78 may be marked along an edge of slot 72.

Dolly 56 is supported by parallel rail members 54, as shown more clearly in FIG. 7, by means of W-shaped guide slides 80 and 82 welded below the dolly 56 respectively proximate the left side thereof, as seen in the drawing, and proximate the right side below plate member 64. The W-shaped guide slides are preferably arranged to extend the whole width of the dolly 56 so as to insure sufficient guidance of the dolly relative to rail members 54, such guidance being provided by the top portion of each rail member 54 engaging the bottom channel groove 86 or 88 of either guide slide 80 or guide slide 82. Clamping means are provided for immobilizing and holding dolly 56 in any position with respect to rail members 54, each of such clamping means consisting of a block member 90 welded or otherwise fastened to the dolly on one side thereof and provided with a vertically disposed bore 92 in which is slidably disposed a rod 94 having a clamping plate 96 on one end thereof disposed below the horizontal portion of rail member 54, and having its other end mounted by way of a pin 98 to an eccentric member 100 manually positionable such as to release clamping plate 96 from engaging the bottom portion of the horizontal portion of rail 54, as shown at the left hand side of FIG. 7 to a position whereby, due to eccentric member 100, rod 94 and clamping plate 96 are upwardly displaced so that plate 96 engages the bottom portion of the horizontal portion of rail member 54, as shown at the right hand side of FIG. 7. Upon track member 66 are mounted in the usual manner one or more joint station pedestals 38, each of which is positionably clampable thereon by means of clamping means 42. Consequently, as shown for example in FIGS. 1 and 2, two swingable joint station jigs may be disposed, as shown, with their respective dollies supported by way of two proximate parallel rail members 54 and with their track members 66 and 66' respectively provided with two pedestals each defining a joint station. as shown at 104 and 106, and at 108 and 110. Such joint stations form respectively the joint stations between the upper chord member 14 and one end of web members 20 and 21 and the joint stations between the upper chord member 16 and one end of web members 25 and 26.

It can thus be seen that the improvement of the invention provides for more accurate and faster setup of an apparatus for fabricating wood trusses by providing joint stations mounted on a track member disposed on a dolly which can be set to any position along rail members disposed perpendicularly to the lower chord of the truss, the track member being adjustably angularly positionable to any slope of a roof, as defined by the inclination of the upper chord members.

Figure 3:
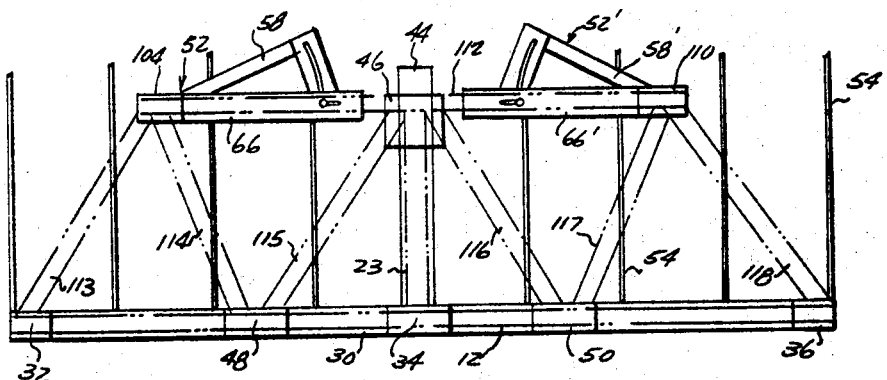
FIG. 3 is a schematic plan view of the apparatus of FIGS. 1-2 set up for fabricating wood trusses having an upper chord substantially parallel to the lower chord.

As shown in FIG. 3, when it is desired to fabricate a truss having parallel upper and lower chords, as shown at 12 and 112, dollies 58 and 58' may be clamped with respect to rail members 54 at the appropriate distance from lower chord track member 30, and track members 66 and 66' are angularly positioned and clamped in a position parallel to the lower chord track member 30. In this manner, by means of joint stations 104 and 110, disposed respectively on track members 66 and 66', a wood truss comprising a lower chord member 12, a parallel upper chord member 112, and having web members 113, 114, 115, 23, 116, 117 and 118, as shown, may be fabricated by way of pedestal mounted joint stations 32, 48, 34, 50 and 36 disposed at appropriate positions on rail member 30, by way of joint station 46 disposed on height rail member 44, and by way of joint stations 104 and 110, disposed respectively on rail members 66 and 66' mounted on dollies 58 and 58'.

Figure 4:
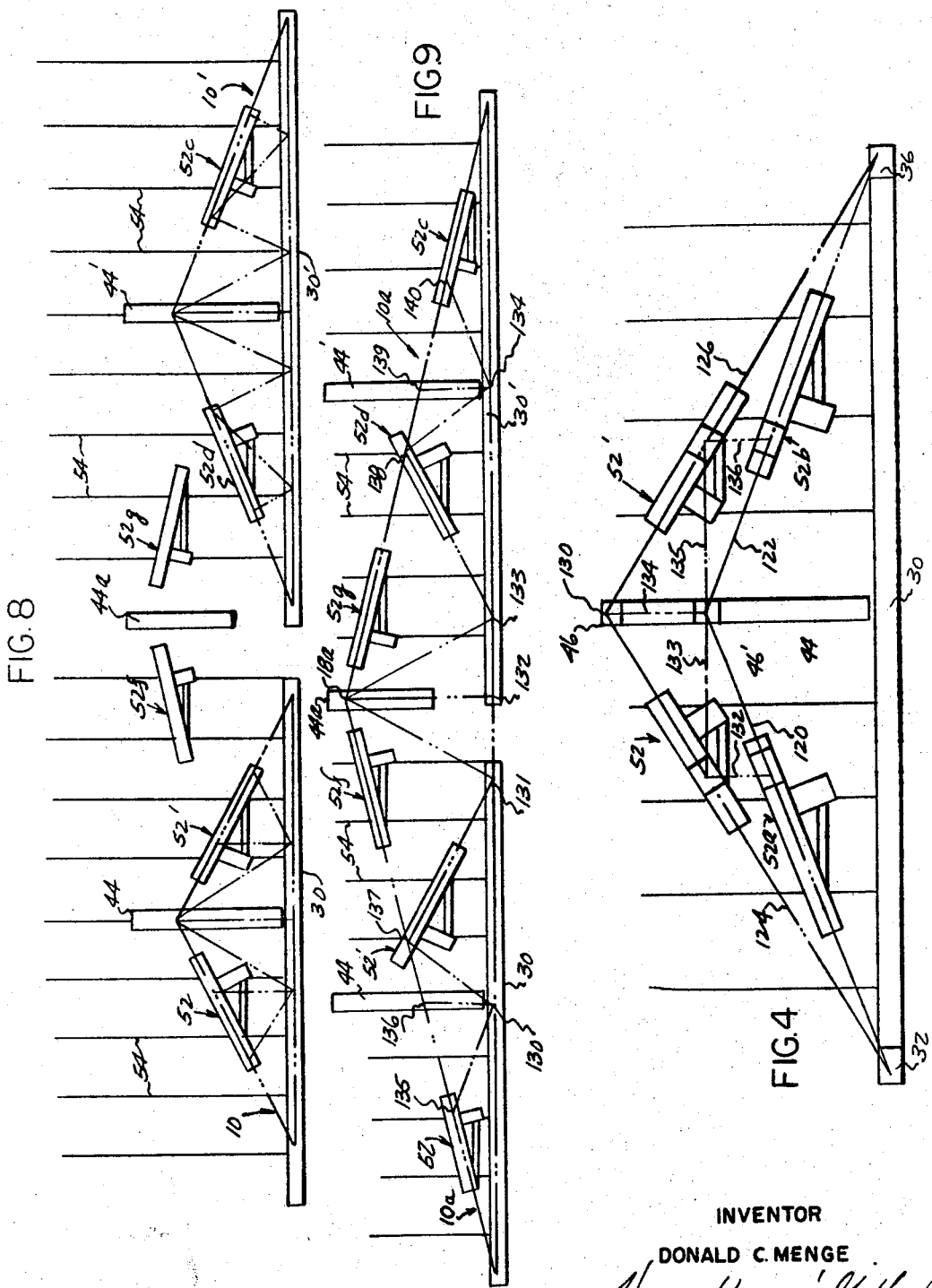
FIG. 4 is an example of the apparatus of FIGS. 1-3 being used for the fabrication of a scissors truss.

As shown in FIG. 4 fabrication of a scissors truss is greatly facilitated through the use of the adjustable jigs of the invention. A scissors truss, consisting of a pair of lower chord members disposed at an angle with respect to each other and indentified by their center lines 120 and 122, respectively, of a pair of upper chord members defined by their center lines 124 and 126 and joined at the apex 130, and being further provided with web members defined by their center lines 132, 133, 134, 135 and 136, can be readily fabricated by means of joint stations 32 and 36 disposed proximate both ends of lower chord track member 30 for joining, respectively, lower chord member 120 with upper chord member 124, and lower chord member 122 with upper chord member 126, by means of joint stations 46 clamped at the apex upon height track member 44, and by means of the angularly adjustable jigs, according to the invention, 52 and 52' disposed along the axes of the upper half chords and jig members 52a and 52b disposed along the axes of the lower half chords. It is thus evident that the improvement of the invention provides for easier, more precise and faster setup of an apparatus for fabricating wood trusses, when the apparatus is setup for fabricating scissors trusses, it being further evident that where the scissors truss has such a span that a plurality of web member is required, each jig member according to the invention may be provided with two or more joining stations, as required.

As shown in FIG. 8, on a given floor space may be disposed two apparatus for fabricating wood structures, including the improvement of the present invention. Such apparatus are respectively the apparatus comprising lower chord track member 30 in combination with height track member 44 and including orientable jigs 52 and 52', for the purpose of fabricating a first truss. A second apparatus comprising lower chord track member 30' in combination with height track member 44', is disposed side by side with the first apparatus and includes orientable jigs 52d and 52c, is set up for fabricating a second truss 10'. Track members 30 and 30' are aligned and a third track member 44a is dispo¬ed at a right angle to the lower chord line as shown, additional orientable jigs 52f and 52g being disposed on rail member 54, where shown, for the purpose of being usable in combination with the two apparatus for fabricating a large span wooden truss 10a as shown in FIG. 9. In the arrangement of FIG. 9, the lower chord members forming truss member 10a are supported by a pedestal clamped upon aligned lower chord track members 30 and 30', the apex 18a of the truss being supported by a joint station being disposed on third track member 44a, and the diverse web members being joined to the upper and lower chord members by way of joint stations, at locations 130, 131, 132, 133, 134, 135, 136, 137, 138, 139 and 140. In this particular setup, orientable jigs 52f and 52g are mainly used for supporting the end of the long upper chord members, close to the apex of the truss 10a, although it is evident that if further web members are desired, joint stations may be disposed where required on orientable jig members 52f and 52g respectively.

Consequently, by the use of the improvement of the present invention, a given floor area may be utilized by two fabricating apparatus disposed side by side for fabricating two different trusses when set up separately, and the two apparatus may be combined in one for fabricating trusses of a span which may be equal to the sum of the span capacities of the two apparatus.

Having thus described the improvement of the invention of illustrative purpose only, by means of an example of structural embodiment thereof, and by some examples of utilization thereof, it is obvious that changes and modifications within the scope and spirit of the invention will be apparent to those skilled in the art, within the scope of the invention as defined in the appended claims.

What is sought to be protected by United States Letters Patent is:

1. Apparatus for fabricating wood trusses of the type having lower chord members, upper chord members and web members extending between the lower chord members and the upper chord members comprising: a first plurality of pedestals supporting said lower chord members and one end of each of said web members at the junction therebetween; a pedestal supporting said upper chord members at their peak and a second and third pluralities of pedestals each supporting each of said upper chord members and the other end of each of said web members at the junction therebetween; each of said pedestals having locating, and guide means for holding said members for junction by way of nailing plates for power driving into said members; a first track anchored to the ground and extending along the lower chord of said trusses for adjustably supporting said first plurality of pedestals; a second track anchored to the ground for adjustably supporting said pedestal, said second track being at a right angle to said first track and substantially aligned with a line extending from the peak of said upper chord members perpendicularly to said lower chord; a plurality of rail members substantially parallel to said second track; at least a third and fourth track each angularly pivotal with respect to a support dolly for supporting respectively said second and third pluralities of pedestals, said dolly being in turn adjustably supported by a pair of juxtaposed rail members; clamping means dependent from each of said pedestals for clamping at a predetermined position on said tracks and clamping means dependent from said dolly for clamping at a predetermined position on said rails; clamping means dependent from each of said third and fourth tracks and their respective dollies for clamping each of said tracks at an angular horizontal position corresponding to the angular position of said upper chord members with respect to said lower chord members.

2. The apparatus of claim 1 wherein each of said rail members is substantially I-shaped and a W-shaped slide is disposed below each of said dollies for engaging the top of each of said rails.

3. The apparatus of claim 2 wherein each of said third and fourth tracks is provided with a substantially vertical axis pivot point proximate one end thereof with respect to one end of said dolly; the other end of said dolly has a plate provided with a partial circular slot having for a radius substantially the distance between said pivot point and said slot; and the last mentioned clamping means comprises a bolt engaged in said slot and passing through an aperture proximate the other end of said track cooperating with a nut for clamping said track at an angular position relatively to said dolly.

4. The apparatus of claim 1 further comprising: a second apparatus substantially like said first named apparatus and disposed proximate said first apparatus with the first track of said second apparatus aligned with the first track of said second apparatus and the second track of said second apparatus on the same side of said first track as the second track of said first apparatus; a third track provided with at least one pedestal is disposed at an intermediate position between the second tracks of said first and second apparatus on the same side relative to said first track; and at least one angularly adjustable track mounted on a dolly is disposed at an intermediate position between the second tracks of said first and second apparatus on the same side relative to said first track; and at least one angularly adjustable track mounted on a dolly is disposed on either sides of said third track, each of said tracks being adapted to support at least one pedestal; whereby said two apparatus in combination are adapted for fabricating wood trusses of a span as long at the total length of said first tracks of said first and second apparatus.

5. A support for pedestals of the types adapted to locate, guide and clamp at their junctions wood members used in fabricating wood trusses comprising chord and web members connected together by way of power driven nailing plates, said support comprising: a dolly of substantially trapezoidal plan shape; guide members below said dolly for engagement with the top section of at least a pair of ground supported parallel rail members; clamping means for clamping said dolly at any predetermined position along said rail members; a track on said dolly adapted to accept at least one of said pedestals; a common vertical axis pivot point proximate one end of said track; an elongated arcuate slot in said dolly of a radius substantially equal to the distance between said pivot point and said slot; and guiding and clamping means proximate the other end of said track and adapted to cooperate with said arcuate slot for horizontal positioning said track at an angular position relatively to an imaginary horizontal line perpendicular to said rail members.

References Cited

UNITED STATES PATENTS

| | | |
|---|---|---|
| 2,983,292 | 5/1961 | McKinley. |
| 3,068,484 | 12/1962 | Moehlenpah. |
| 3,069,684 | 12/1962 | Moehlenpah. |
| 3,255,943 | 6/1966 | Sanford. |

ROBERT C. RIORDON, Primary Examiner.

J. F. McKEOWN, Assistant Examiner.

U.S. Cl. X.R.

29—2; 144—288; 227—152